United States Patent
Matsuoka (10) Patent No.: US 12,012,096 B2
(45) Date of Patent: Jun. 18, 2024

(54) INFORMATION PROCESSING APPARATUS, INFORMATION PROCESSING METHOD, AND STORING MEDIUM

(71) Applicant: TOYOTA JIDOSHA KABUSHIKI KAISHA, Toyota (JP)

(72) Inventor: Katsuhiro Matsuoka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 305 days.

(21) Appl. No.: 17/554,201

(22) Filed: Dec. 17, 2021

(65) Prior Publication Data
US 2022/0194365 A1    Jun. 23, 2022

(30) Foreign Application Priority Data

Dec. 22, 2020    (JP) ................. 2020-212719

(51) Int. Cl.
- *B60W 30/09* (2012.01)
- *B60W 30/18* (2012.01)
- *B60W 50/14* (2020.01)

(52) U.S. Cl.
CPC ...... *B60W 30/09* (2013.01); *B60W 30/18109* (2013.01); *B60W 50/14* (2013.01); *B60W 2050/146* (2013.01)

(58) Field of Classification Search
CPC ........... B60W 30/09; B60W 30/18109; B60W 50/14; B60W 2050/146; B60W 2554/802; B60W 2556/45; B60W 50/0097; G08G 1/161; G08G 1/166; G08G 1/162
See application file for complete search history.

(56) References Cited

U.S. PATENT DOCUMENTS

| | | | |
|---|---|---|---|
| 8,854,198 B2* | 10/2014 | Tengler | G08G 1/161 340/436 |
| 8,907,814 B2* | 12/2014 | Chen | G08G 1/094 340/904 |
| 11,242,051 B1* | 2/2022 | Konrardy | G08G 1/096791 |
| 2015/0198692 A1 | 7/2015 | Goto | |
| 2021/0139025 A1* | 5/2021 | Kim | G06N 3/08 |

FOREIGN PATENT DOCUMENTS

| | | |
|---|---|---|
| CN | 108944864 A | 12/2018 |
| JP | H10-250510 A | 9/1998 |
| JP | 2004-252718 A | 9/2004 |
| JP | 2005-010937 A | 1/2005 |
| JP | 2009-75703 A | 4/2009 |
| JP | 2009-140327 A | 6/2009 |
| JP | 2012-088964 A | 5/2012 |
| WO | 2014/050048 A1 | 4/2014 |

* cited by examiner

*Primary Examiner* — Navid Z. Mehdizadeh
*Assistant Examiner* — Shelley Marie Osterhout
(74) *Attorney, Agent, or Firm* — Sughrue Mion, PLLC (57) ABSTRACT

An information processing apparatus mounted on a first vehicle determines that an alert to decelerate is being issued to a driver of a preceding vehicle that precedes the first vehicle; and performs a predetermined process related to risk avoidance when the alert is being issued is the preceding vehicle.

15 Claims, 12 Drawing Sheets

ROADSIDE DATA

| ID of the intersection | Location information | ID of traffic signals | Bearing of the connected road | Cycle Information | Current Status | Remaining time |
|---|---|---|---|---|---|---|
| I001 | ... | S001 (301A) | 0° | Green 60 Secs. Yellow 5 Secs. Red 50 Secs. | Green | 20 Secs. |
| I001 | ... | S002 (301B) | 180° | Green 60 Secs. Yellow 5 Secs. Red 50 Secs. | Green | 20 Secs. |
| I001 | ... | S003 (301C) | 90° | Green 50 Secs. Yellow 5 Secs. Red 60 Secs. | Red | 25 Secs. |
| I001 | ... | S004 (301D) | 270° | Green 50 Secs. Yellow 5 Secs. Red 60 Secs. | Red | 25 Secs. |

| VEHICLE DATA | | | | | |
|---|---|---|---|---|---|
| VEHICLE ID | LOCATION INFORMATION | TRAVELING DIRECTION | SPEED | ... | ALERT FLAG |
| V001 | ... | 90° | 35km/h | ... | 0 |

INFORMATION PROCESSING APPARATUS, INFORMATION PROCESSING METHOD, AND STORING MEDIUM

CROSS REFERENCE TO THE RELATED APPLICATION

This application claims the benefit of Japanese Patent Application No. 2020-212719, filed on Dec. 22, 2020, which is hereby incorporated by reference herein in its entirety.

BACKGROUND

Technical Field

The present disclosure relates to vehicle travel control technologies.

Description of the Related Art

There is a system to prevent rear-end collisions between vehicles. For example, Japanese Patent Laid-Open No. 2012-083964 discloses a system for giving an alert relating to a rearrangement. In this system, the timing of calling attention to a following vehicle is changed based on the possibility that a preceding vehicle performs a deceleration operation.

For example, if the vehicle is likely to slow down, an alert may be given to the subsequent vehicle by early lighting of the brake lamp.

SUMMARY

It is an object of the present disclosure to ensure safety when a vehicle is traveling.

The present disclosure in one aspect provides an information processing apparatus mounted on a first vehicle, comprising a controller configured to: determine that an alert to decelerate is being issued to a driver of a preceding vehicle preceding the first vehicle; and perform a predetermined process related to risk avoidance when the alert is being issued in the preceding vehicle.

The present disclosure in another aspect provides an information processing apparatus mounted on a first vehicle, comprising a controller configured to: alert a driver of the first vehicle to decelerate based on first data received from an external device; when the alert is issued, transmit to the outside second data indicating that the alert has issued; and perform a predetermined process related to risk avoidance when the second data is received from a preceding vehicle, which is a vehicle preceding the first vehicle.

The present disclosure in another aspect provides an information processing method executed by a first vehicle, the information processing method comprising: determining that an alert to decelerate is being issued to a driver of a preceding vehicle, which is a vehicle preceding the first vehicle; and performing a predetermined process related to risk avoidance when the alert is issued in the preceding vehicle.

Another embodiment includes a program for causing a computer to execute the information processing method described above, or a computer-readable storage medium in which the program is stored non-temporarily.

According to the present disclosure, it, is possible to secure safety when the vehicle is traveling.

DESCRIPTION OF THE EMBODIMENTS

A vehicle system according to the present embodiment is a system including a roadside unit, and a plurality of on-board devices mounted respectively on plurality of vehicles.

A first aspect of the present disclosure is an information processing apparatus mounted on a first vehicle.

More specially, an electronic control unit (ECU) (or controller) is configured to determine that an alert cc the effect that the vehicle should be decelerated is being issued to the driver of a preceding vehicle, which is the vehicle preceding the first vehicle, and perform a predetermined process related to risk avoidance when the alert is being issued in the preceding vehicle.

The controller determines that an alert is being issued to the driver of the preceding vehicle to decelerate (or stop). The alert may be, for example, an alert of a red signal or an alert of a fear of ignoring the signal.

If the preceding vehicle is alerted, it can be said that the vehicle is likely to start decelerating immediately. In such cases, the controller will take measures to prevent a rear-end collision in the first vehicle. The predetermined processing includes, for example, processing for notifying the driver that there is a possibility of a rapid deceleration of a preceding vehicle, and processing for automatically applying braking of the first vehicle.

Further, the controller may determine that the alert is being issued in the preceding vehicle based on the data transmitted from the preceding vehicle.

The data may be broadcast and transmitted by inter-vehicle communication, for example.

The data may include location information of the vehicle that transmitted the data. The controller may determine the data transmitted from the preceding vehicle based on the location information included in the data.

The data may include location information of the vehicle that transmitted the data and the traveling direction. The controller may discriminate the data transmitted from the preceding vehicle based on the location information and the traveling direction included in the data.

By comparing the location information of the vehicle that has transmitted the data (and the traveling direction) with the location information of the vehicle (and traveling direction), whether the vehicle that has transmitted the data is a vehicle preceding the vehicle can be determined.

The controller may notify the driver of the first vehicle that the preceding vehicle may decelerate as the predetermined process.

When the first vehicle performs control to follow the preceding vehicle, the controller may perform a process of decelerating the first vehicle as the predetermined process.

According to such a configuration, it is possible to prepare for a rapid deceleration of the preceding vehicle.

The controller may stop the following control when the preceding vehicle does not start decelerating within a predetermined time after the predetermined process is started.

If preceding vehicle is alerted, it is expected that the following vehicles will also be decelerated or stopped. Therefore, it is preferable to stop the following control.

A second aspect of the present disclosure is an information processing apparatus mounted on a first vehicle.

More specifically, the vehicle control apparatus has a controller configured to: alert a driver of the first vehicle to decelerate based on first data received from an external device; when the alert is issued, transmit second data indicating that the alert is issued, to the outside; and when the second data is received from a preceding vehicle, which is a vehicle preceding the first vehicle, perform a predetermined process related to risk avoidance.

Thus, the same information processing apparatus may be mounted on both the preceding vehicle and the following vehicles.

The controller may be characterized in that, when the second data is received from the preceding vehicle, the predetermined process is performed regardless of the content of the first data.

That is, the data received from the preceding vehicle is prioritized over the data received from the external device to perform the operation for avoiding dangers. As a result, it is possible to reduce the risk of a rear-end collision.

Further, the controller may be characterized in that a degree of danger is calculated based on the first data and the driving condition of the first vehicle, and when the degree of danger is equal to or greater than a predetermined value, the alert is issued.

For example, it is possible to determine whether or not to issue an alert based on the probability that a traffic violation such as ignoring a signal occurs or the degree of danger when the traffic violation occurs.

Further, the external device may be a roadside unit associated with the traffic signal, the first data may be characterized in that it is data for notifying a stop signal.

According to such a configuration, it is possible to prevent the occurrence of signal neglect due to careless driving or the like.

Hereinafter, embodiments of the present disclosure will be described based on the drawings. The configuration of the following embodiments is illustrative, and the present disclosure is not limited to the configuration of the embodiment.

First Embodiment

An outline of the vehicle system according to the first embodiment will be described with reference to FIG. 1. The system according to the present embodiment includes a roadside unit 100 and an in-vehicle terminal 200 mounted on at least two vehicles 10.

In the following description, the vehicle refers to a vehicle in which the in-vehicle terminal 200 is mounted.

The roadside unit 100 is a device for providing information to the vehicle 10 traveling on the road. In the present embodiment, the roadside unit 100 also serves as a controller for traffic signals installed at intersections, and wirelessly transmits the state of the lights of the traffic signals to the vehicle 10 located near the intersection (e.g., a radius of 100 meters). The data transmitted by the roadside unit 100 to the vehicle 10 is referred to as roadside data.

The in-vehicle terminal 200 is a computer mounted on a plurality of vehicles 10. The in-vehicle terminal 200 determines the degree of danger based on the roadside data received from the roadside unit 100, and outputs an alert according to the determined degree of danger. For example, if the vehicle 10 is traveling toward the red signal and the speed is not decreasing (i.e., there is a risk of ignoring the signal), the in-vehicle terminal 200 issues a warning to the driver, such as by an audible alert.

Further, the in-vehicle terminal 200, when outputting an alert in the vehicle, also notifies toward the periphery vehicle that it is outputting an alert.

Further, when receiving the notification from the in-vehicle terminal 200 mounted on another vehicle, the in-vehicle terminal 200 outputs a notification to the driver to the effect that attention should be paid to the behavior of the other vehicle, for example, rapid deceleration.

In the following explanation, an example is given in which two vehicles are traveling in succession in the front and rear. The vehicle 10 that runs ahead is called a "preceding vehicle", and the vehicle 10 that runs immediately after the preceding vehicle is called a "trailing vehicle".

In the embodiment, the preceding vehicle outputs an alert based on the roadside data received from the roadside unit 100, and the following vehicles receive a notification of the alert. In this embodiment, both the preceding vehicle and the succeeding vehicle are mounted with the same in-vehicle terminal 200.

In a system in which the vehicle issues an alert based on data received from the roadside unit 100, the driver who notices the alert may suddenly brake, which may be a cause that threatens the safety of the running of the subsequent vehicle. On the other hand, in the vehicle system according to the present exemplary embodiment, the driver of the subsequent vehicle can be prepared for the behavior of the preceding vehicle in order to alert the driver of the subsequent vehicle at the stage when the preceding vehicle outputs an alert.

The components of the system are described in detail.

The roadside unit 100 can be configured by a general-purpose computer. That is, the roadside unit (PCU) 100 may be configured as a computer having a processor such as a CPU or a GPU, a main storage device such as a RAM or a ROM, a EPROM, a hard disk drive, and an auxiliary storage device such as a removable medium. The auxiliary storage device stores an operating system (OS), various programs, various tables, and the like, and executes a program stored therein, thereby realizing each function that matches a predetermined purpose, as will be described later. However, some or all of the functions may be realized by hardware circuits such as a ASIC and a FPGA.

Figure 1:
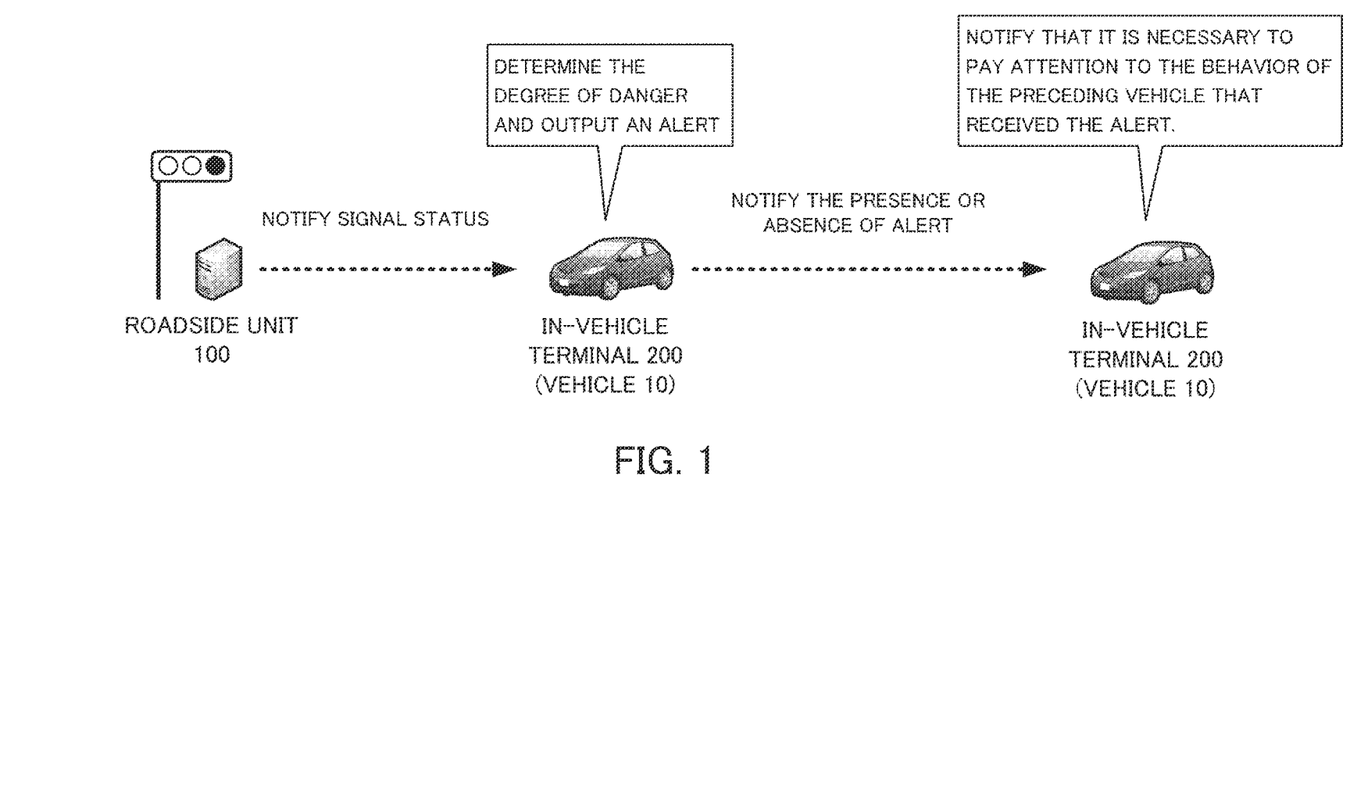
FIG. 1 a schematic diagram of a vehicle system according to an embodiment.
Figure 2:
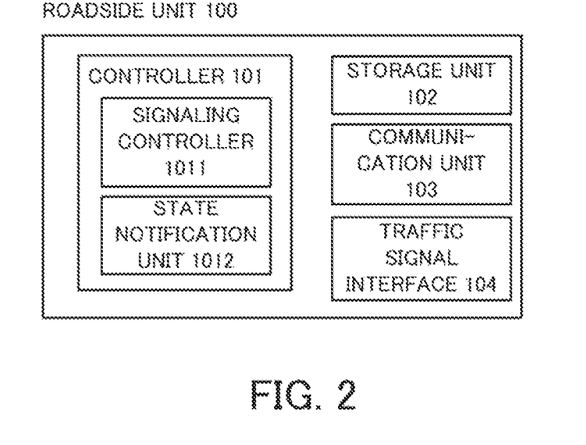
FIG. 2 is a block diagram schematically showing an example of a roadside unit.

FIG. 2 is a block diagram schematically showing an example of the configuration of the roadside unit 100 shown in FIG. 1. The roadside unit 100 includes a controller 101, a storage unit 102, a communication unit 103, and a traffic signal interface 104.

The controller 101 is a device for controlling the roadside system 100. The controller (or electronic control unit (ECU)) 101 is composed of, for example, CPUs.

The controller 101 has, as a functional module, a signaling controller 1011 and a state notification unit 1012. Each function module may be realized by executing a program stored in a storage unit such as a ROM by the CPU.

The signaling controller 1011 controls the lights of the traffic signals. Specifically, it calculates the signal cycle, and outputs a command to switch the light every predetermined cycle. The control of the lights can be performed via a traffic signal interface 104, which will be described later.

Figure 3:
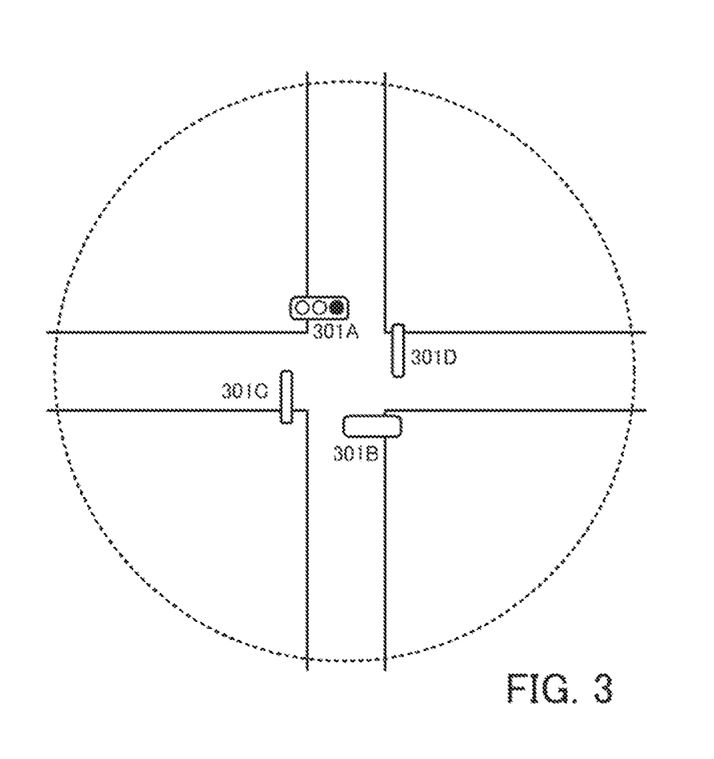
FIG. 3 is a schematic diagram showing an example of an intersection managed by the system.

FIG. 3 is a sketch showing an example of an intersection where the signal corresponding to the roadside unit 100 is installed. In the present embodiment, in order to control the vertical traffic flow and the lateral traffic flow, the signaling controller 1011 performs control for the respective pairs of the traffic signal 301A and 302B, and the traffic signal 301C and 302D.

The state notification unit 1012 generates data (roadside data) for notifying the vehicle 10 of the current state of the traffic signal (the state of the lights), and broadcasts the data by a radio signal. The area surrounded by the dotted line in FIG. 3 represents the scope where the radio signal reaches.

Figure 4:
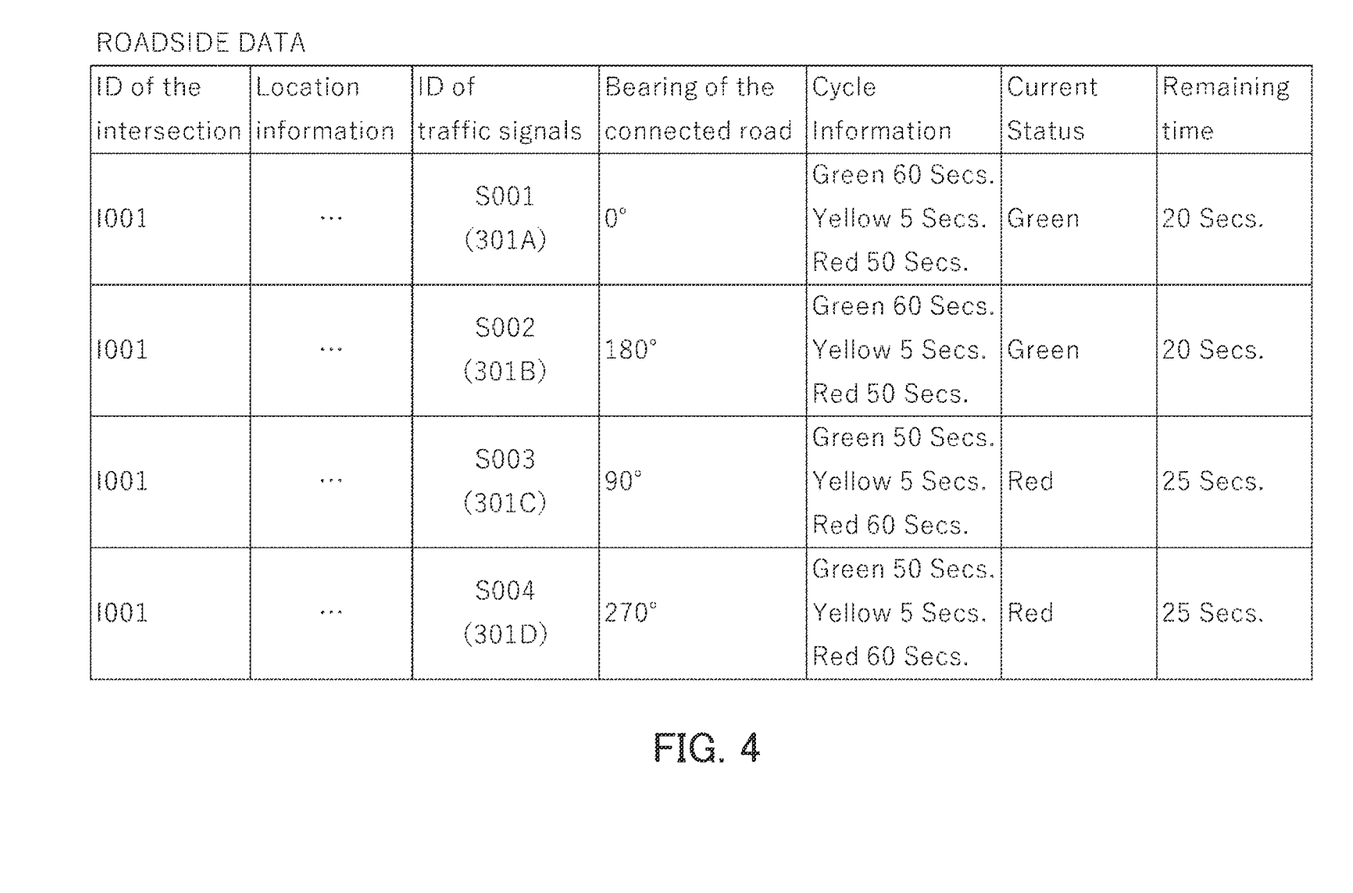
FIG. 4 is an example of roadside data transmitted from the roadside unit.

FIG. 4 is an example of roadside data transmitted from the roadside unit 100 corresponding to the intersection shown in FIG. 3. The roadside data includes information about the identification of the intersection (or roadside unit 100), the location information of the intersection, the identification of multiple traffic signals, the bearing of the road to be connected to each traffic signal, information about the cycle of the light, the state of the current lights, the remaining time until the status changes, and so on.

By transmitting this information, from the roadside unit 100 to the in-vehicle terminal 200, it is possible to notify the state of the signal (or, the timing at which the signal changes) to the in-vehicle terminal 200.

In this example, the azimuth to which the road is connected is represented by a numerical value, but data indicating the connection relationship of the road (map information) may be included in the roadside data.

The storage unit 102 is a unit configured to store information, and is composed of a storage medium such as a RAM, a magnetic disk, or a flash memory. The storage unit 102 stores various programs to be executed the controller 101, data used by the programs, and the like. The storage unit 102 stores data for controlling the traffic signals, such as data relating to signal cycles and time tables.

The communication unit 103 is an interface for performing road-to-vehicle communication with the in-vehicle terminal 200 by radio. The communication unit 103, for example, between the in-vehicle terminal 200, performs DSRC communication using radio waves in the 5.8 GHz band.

The traffic signal interface 104 is an interface unit for connecting the roadside unit 100 and a plurality of traffic signals, e.g., a 301A-301D. The controller 101 may switch the state of the lights of the plurality of traffic signals by sending a command to the traffic signal interface 104.

Figure 5:
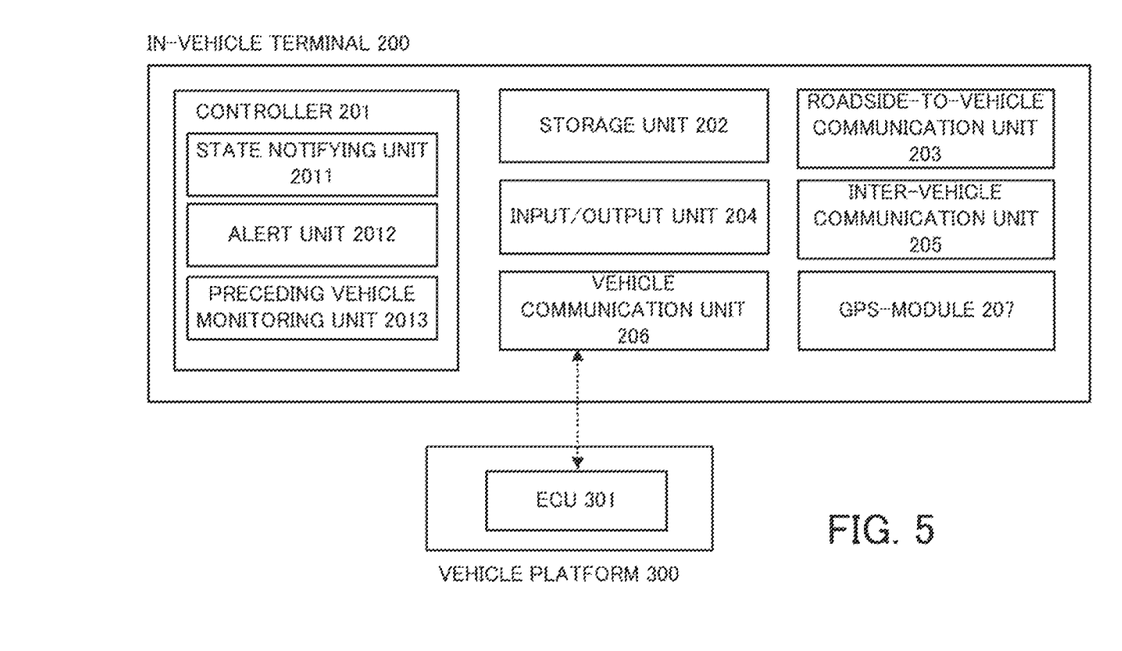
FIG. 5 is a block diagram schematically showing an example of an in-vehicle terminal.

Next, the in-vehicle terminal 200 will be described with reference to FIG. 5.

The in-vehicle terminal 200 is a small computer mounted on the vehicle 10. The in-vehicle terminal 200 is configured with a controller 201, a storage unit 202, a roadside-to-vehicle communication unit 203, an input/output unit 204, an inter-vehicle communication unit 205, a vehicle communication unit 206, and a GPS-module 207.

The controller 201 is a unit configured to control the in-vehicle terminal 200. The controller 201 is an electronic control unit (ECU) configured by, for example, a microcomputer. The controller 201 may realize these functions by executing a program stored in storage unit 202 to be described later by the CPU.

The controller 201 has a state notifying unit 2011, an alert unit 2012, and a preceding vehicle monitoring unit 2013 as function modules. Each function module may be realized by executing a program stored in the storage unit (ROM or the like) by the CPU.

Figure 6:
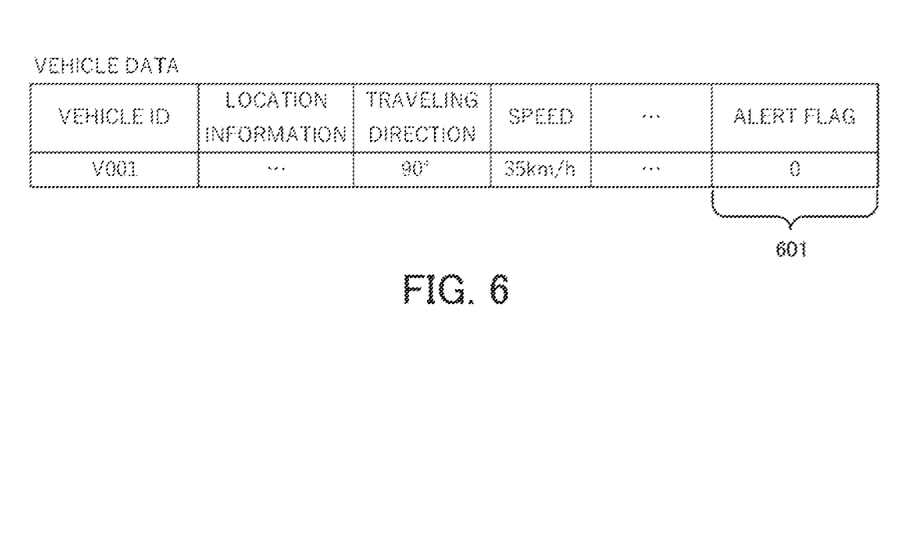
FIG. 6 is an example of vehicle data transmitted from an in-vehicle terminal.

The state notifying unit 2011 acquires data relating to the traveling of the vehicle (hereinafter, vehicle data), and the vehicle data, via the inter-vehicle communication unit 205 to be described later, is broadcast by radio. Information relating to the traveling of the vehicle, for example, but not limited to, includes the identification of the vehicle, the location information, the traveling direction, the speed, and the like. FIG. 6 shows an example of vehicle data. The alert flag will be described later.

The location information and the traveling direction of the own vehicle can be obtained from the GPS module 207 to be described later. In addition, the speed of the own vehicle can be acquired from the vehicle platform 300, which will be described later.

The vehicle data is transmitted at predetermined intervals, e.g., every 100 milliseconds. Transmitted vehicle data is utilized by other vehicles for traffic safety. By a plurality of vehicles broadcasting transmit vehicle data, and other vehicles receiving and using the data, for example, encounter accidents, contact accidents, etc., can be prevented by utilization of the broadcasted or transmitted data.

The alert unit 2012 outputs an alert to the driver based on the roadside data received from the roadside unit 100. Specifically, (1) the positional relationship between the traffic signal associated with the roadside unit 100 and the own vehicle is determined, and (2) when there is a red signal in front of the traveling direction, when the vehicle is traveling at a speed at which the vehicle cannot safely stop up to a predetermined stop position, an alert is issued to the driver.

Incidentally, in this example, an example of outputting an alert when the driver is predicted to overlook the red signal, the output may be a preliminary alert to prevent oversight of the red signal. In addition, a plurality of stages of alerts may be output based on the degree of danger.

After the alert unit 2012 outputs the alert, the vehicle data state notifying unit 2011 set a flag for notifying the output presence or absence of the alert (alert flag 601). A true value (1) is set to the alert flag during the period in which the alert is output, and a false value (0) is set to the alert flag during the period in which the alert is not output. Incidentally, if the alert has a plurality of stages, it may set an alert flag in any stage. Vehicle data for which a true value is set in the alert flag corresponds to "second data" in the present disclosure.

The true value of the alert flag included in the vehicle data means that in the vehicle interior of the vehicle that has transmitted the vehicle data, an alert prompting deceleration or stop is outputted. Vehicles that have transmitted such vehicle data are likely to exhibit unstable behavior, such as rapid deceleration. By broadcasting the vehicle data including the alert flag, for example, it is possible to alert the following vehicle that "the behavior of preceding vehicle should be noted".

The preceding vehicle monitoring unit 2013 issues an attention notification to the driver based on the alert flag included in the vehicle data received from the other vehicle. Specifically, when the vehicle data is received from another vehicle, the positional relation between the vehicle and the vehicle concerned is determined, and when the alert flag is set in the vehicle data transmitted from the vehicle running immediately before the vehicle, a notification indicating that "attention should be paid to the behavior of preceding vehicle" is output.

A storage unit 202 is a unit configured to store information, and is composed of a storage medium such as a RAM, a magnetic disk, or a flash memory. The storage unit 202 stores various programs and data to be executed by the controller 201.

The roadside-to-vehicle communication unit 203 is a communication unit for performing radio communication with the roadside unit 100. The roadside-to-vehicle communication unit 203 performs radio communication in the same manner as communication unit 103.

Input/output unit 204 is a unit configured to accept an input operation performed by the user and present information to the user. Specifically, it is composed of a touch panel and a respective control unit, and a liquid crystal display and a respective control unit. The touch panel and the liquid crystal display consist of one touch panel display in the present embodiment. Input/output unit 204 may include a speaker or the like for outputting sound.

The inter-vehicle communication unit 205 is an interface for performing wireless communication with another in-vehicle terminal 200 mounted on another vehicle. The inter-vehicle communication unit 205, for example, performs DSRC communication using radio waves in the 5.8 GHz band, with another in-vehicle terminal 200 mounted on another vehicle.

The vehicle communication unit 206 is an interface unit for communicating with the vehicle platform 300. The vehicle communication unit 206 is configured to be able to communicate with ECU301 of the vehicle platforms 300 via in-vehicle networks.

A GPS module 207 receives the radio waves transmitted from the artificial satellite, and is a module for calculating the location information.

The vehicle platform 300 is a platform including a computer for controlling the vehicle 10. The vehicle platform 300 includes one or more computers (ECU 301) that control the vehicle, such as an engine ECU, a body ECU, and an autonomous ECU, for example.

Next, a detailed description will be given of the processing performed by each component included in the system.

Figure 7:
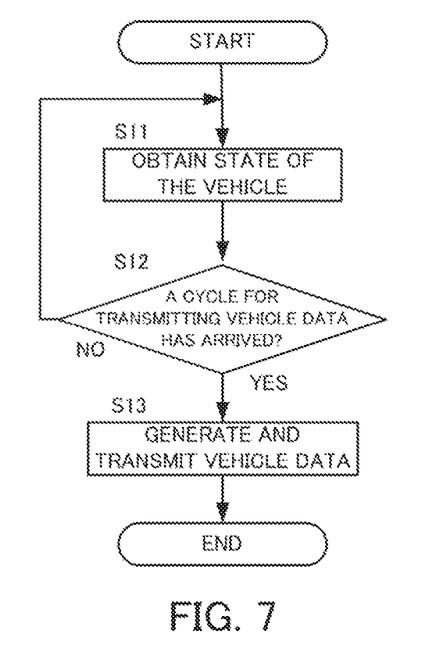
FIG. 7 is a flowchart of the processing performed by the in-vehicle terminal.

FIG. 7 is a flowchart showing a process in which the in-vehicle terminal 200 broadcasts vehicle data. The process shown in the drawing, is executed by the controller 201 (status notifying unit 2011), at predetermined intervals.

First, in step S11, communication is performed with the vehicle platform 300 via the vehicle communication unit 206 to obtain data regarding the state of the vehicle. Such data may include, for example, location information, direction of travel, speed, etc.

Next, in step S12, it is determined whether or not a cycle for transmitting vehicle data has arrived. The period of transmitting the vehicle data may be, for example, every 100 milliseconds. If the cycle has not arrived, the process returns to the initial state. If the cycle has arrived, the process proceeds to S13, where vehicle data including the acquired data is generated, and the broadcast is transmitted via the inter-vehicle communication unit 205.

Figure 8:
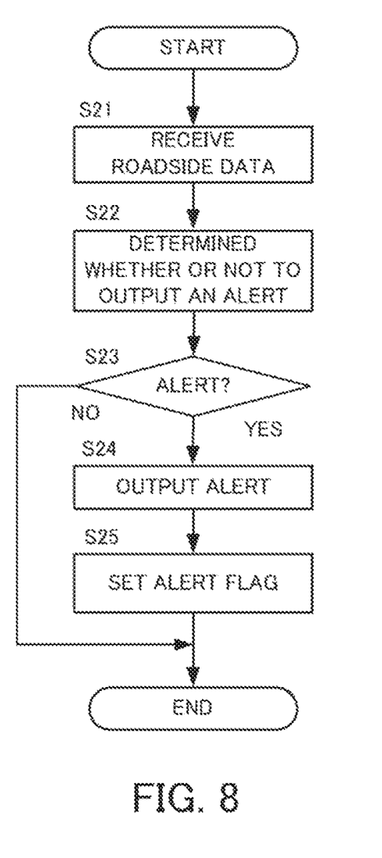
FIG. 8 is a flowchart of the processing performed by the in-vehicle terminal.

FIG. 8 is a flowchart showing a process in which the in-vehicle terminal 200 receives roadside data from the roadside unit 100 and performs an alert based on the received roadside data. The illustrated process is executed by the controller 201 (the alert unit 2012) at predetermined intervals.

First, in S21, roadside data is received from the roadside unit 100 via the roadside-to-vehicle communication unit 203.

Next, in step S22, it is determined whether or not to output an alert based on the received roadside data.

Figure 9:
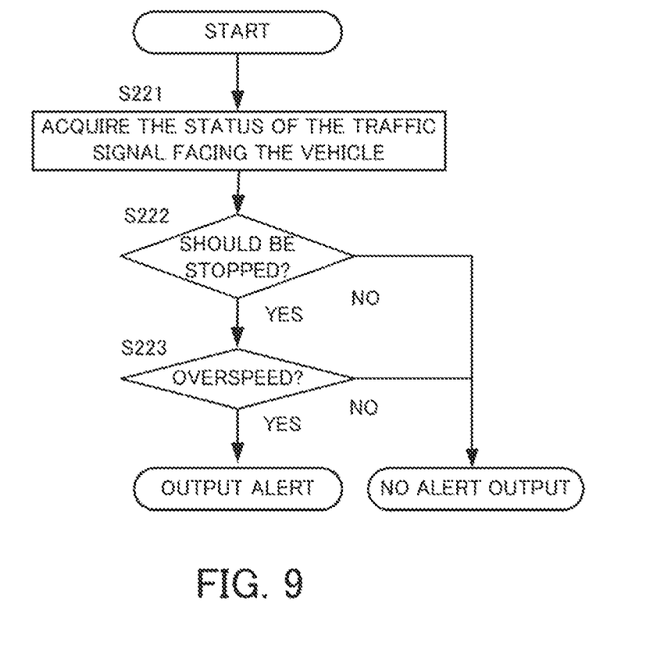
FIG. 9 is a flow chart showing the process in step S22.

FIG. 9 is a flowchart showing in detail the processing in step S22.

First, in step S221, the status of the traffic signal facing the vehicle is acquired based on the roadside data. For example, in the exemplary embodiment of FIG. 3, it is assumed that the vehicle is running in a direction facing the traffic signal 301A. That is, the heading of the traveling direction is 0 degrees. In this case, it is assumed that the in-vehicle terminal 200 has received the roadside data shown in FIG. 4. In the illustrated embodiment, the ID of the traffic signal corresponding to the traveling direction of the own vehicle is "S001", and the present state is "green". On the other hand, when the own vehicle is traveling in a direction facing the traffic signal 301O, the heading in the traveling direction becomes 90 degrees, and the present state of the corresponding traffic light becomes "red".

Incidentally, in this example, the signal facing the vehicle can be identified based on the traveling direction of the vehicle, or the signal facing the vehicle can be identified based on the map information if the map information is included in the roadside data.

Next, in step s222, it is determined whether or not the vehicle is to be stopped. In this step, if it is predicted that the signal will change to red before the vehicle reaches the predetermined stop position (stop line), an affirmative decision will be made that the vehicle should be stopped. The predetermined stop position can be determined by the position information included in the roadside data. The timing at which the signal changes to the red signal can be determined based on the "remaining time" included in the roadside data. If it is predicted that the signal will not change to red before the own vehicle reaches the stop position, this step becomes a negative determination, and no alert is output.

When an affirmative determination is made in step S222, the process shifts to step S223.

Figure 10:
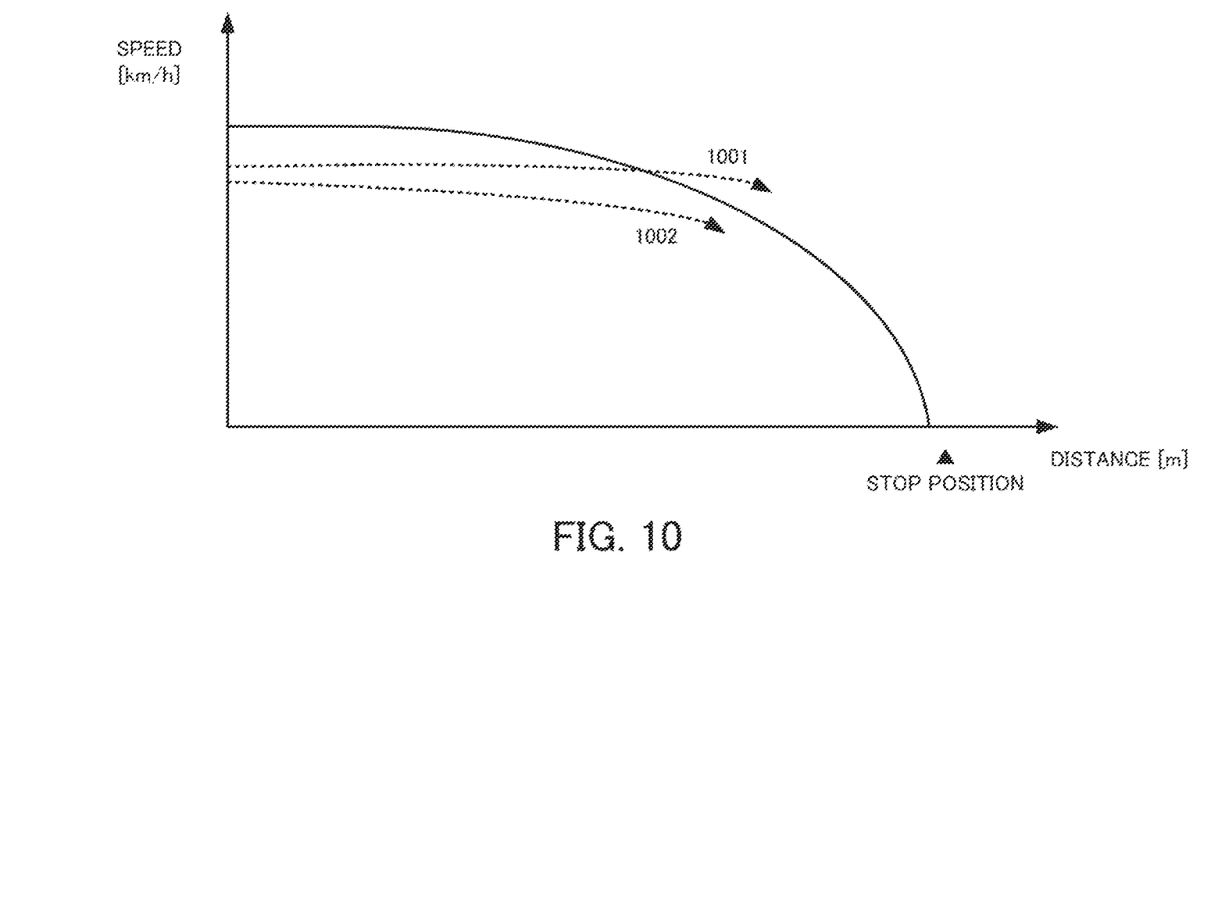
FIG. 10 is a diagram showing the speed pattern in deceleration.

In step S223, it is determined whether the speed of the own vehicle exceeds the specified speed, i.e., whether there is an overspeed. The specified speed can be defined by data (speed pattern) showing the relationship between the remaining distance to the stop position and the speed, as shown in FIG. 10. The speed pattern shown, for example, represents a speed that can be stopped with a margin to a predetermined stop position.

When the speed of the own vehicle exceeds the speed indicated by such a pattern, it means that the vehicle cannot stop with a margin to the specified stop position. For example, as indicated by reference numeral 1001, if the speed of the own vehicle exceeds the speed indicated by the pattern, an affirmative determination is made at the step S223. Further, for example, as indicated by reference numeral 1002, when the speed of the own vehicle does not exceed the speed indicated by the pattern, a negative determination is made in the step S223.

Incidentally, in this example, the determination was made based on the speed of the vehicle, if it can be determined that there is a risk of performing the signal ignoring, it may be utilized by other information. For example, a step S223 may be used to determine that the brake pedal of the vehicle is not depressed or that the accelerator pedal is depressed, and an affirmative determination may be made if there is no sign of deceleration.

Figure 11A:
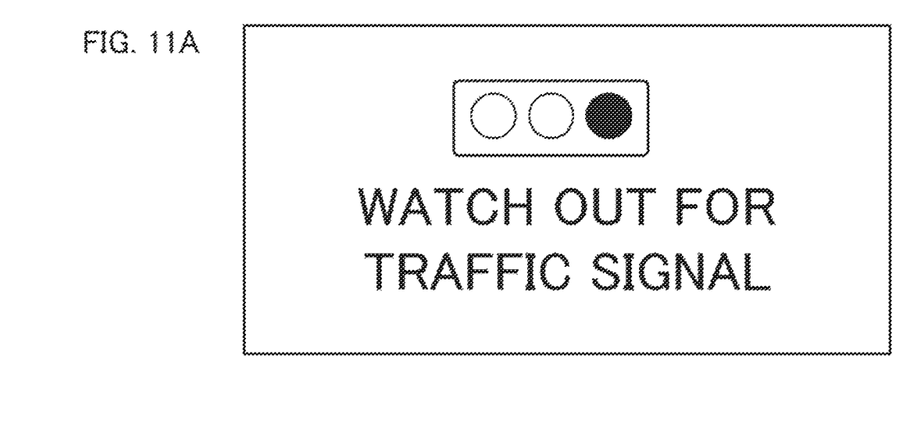
FIGS. 11A and 11B show examples of images presented to the driver.
Figure 11B:
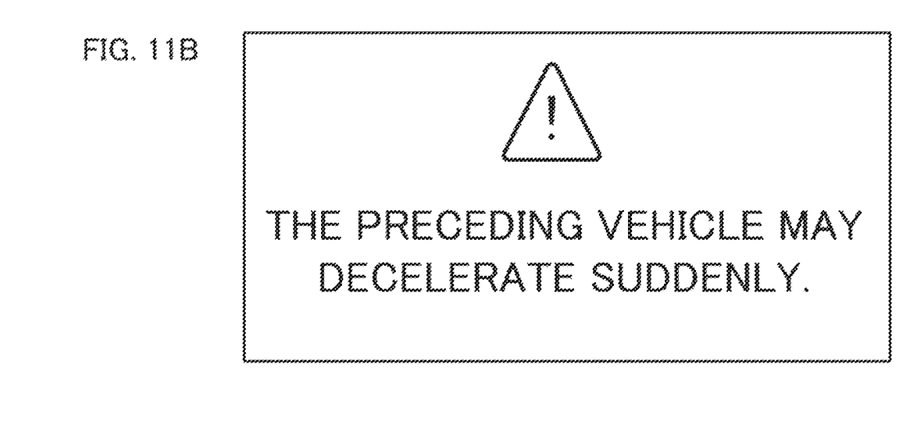

If an affirmative decision is made in step S223, the process proceeds to step S24 (FIG. 8), and an alert is output to the driver of the vehicle. The alert may be output by an image, for example, as shown in FIGS. 11A and 11B, or may be output by an alert sound. These may be used in combination.

In the present example, based upon a determination that the alert should be output, a plurality of levels of the alert may be set, so as to output an alert by a method corresponding to the set level. The level of the alert may be determined, for example, according to the degree of danger. For example, the higher the deceleration required to stop at a defined stop position, the more dangerous it may be determined and a higher level of alert may be provided.

When the alert is output in step S24, the alert flag included in the vehicle data is set to a true value in step S25. The vehicle data including the alert flag is broadcast in the next transmission cycle. If step S25 is not executed, the alert flag included in the vehicle data remains a false value.

Figure 12:
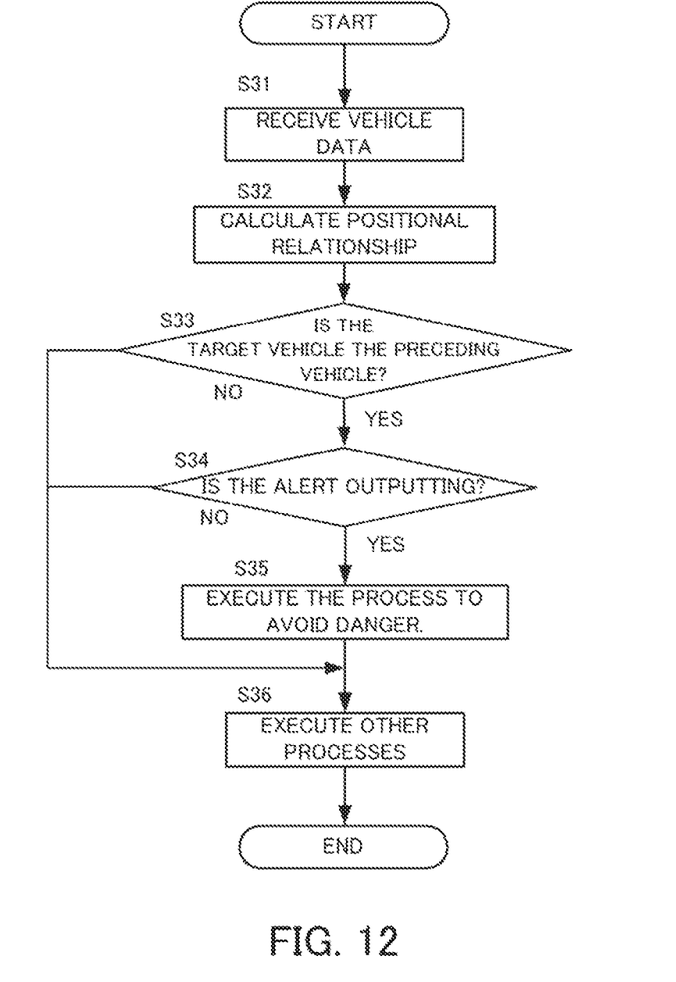
FIG. 12 is flowchart of the processing performed by the in-vehicle terminal.

FIG. 12 is a flowchart showing processing executed when the in-vehicle terminal 200 receives vehicle data. The process illustrated is executed by controller 201 (the preceding vehicle monitoring unit 2013) at predetermined intervals.

First, in step S31, vehicle data broadcast from another vehicle is received.

Next, in step S32, the positional relationship between the vehicle that has transmitted the vehicle data and the own vehicle is calculated. Specifically, the location information and the traveling direction included in the vehicle data, acquires the location information and traveling direction obtained by the in-vehicle terminal 200 or the vehicle platform 300, and acquires the relative positional relationship between the vehicles. Here, when the following conditions are satisfied, the vehicle that has transmitted the vehicle data can be determined to be a vehicle that travels immediately before the own vehicle.

(1) If the Directions of Travel are the Same

For example, when the traveling directions of the two vehicles are lower than the threshold value, it can be determined that the two vehicles are traveling in the same direction.

(2) When Driving in the Same Lane

If a target vehicle exists within a predetermined range along the traveling direction of the own vehicle, it can be determined that both vehicles are traveling in the same lane.

(3) When the Relative Distance between Vehicles is Less than or Equal to a Predetermined Value For example, if the relative distance between the vehicles is 5 meters or less, it can be determined that a target vehicle is running immediately in front of the own vehicle.

When the target vehicle is a vehicle preceding the own vehicle (step S33—Yes), the process proceeds to step S34. If target vehicle is not a vehicle preceding the own vehicle (step S33—No), the process proceeds to step S36.

In step S34, it is determined whether or not an alert is output in the target vehicle. If an alert is being output (i.e., if the alert flag included in the vehicle data has a true value), the process proceeds to step S35. When the alert is not output, that is, when a false value is set in the alert flag included in the vehicle data, the process proceeds to step S36.

In step S35, a process for avoiding danger is executed in the vehicle. In the preceding vehicle, the driver who noticed the alert may suddenly brake when the alert indicating that the speed should be reduced is issued. Therefore, in this step, a notification is generated and output indicating that it is necessary to prepare for a rapid deceleration of the preceding vehicle. The alert may be output by an image, for example, as shown in FIG. 11B, or may be output by an alert sound. These may be used in combination.

In addition, other processes may be performed to assist in risk avoidance. For example, when the vehicle 10 is equipped with a function of assisting a brake, the brake may be automatically operated or a preliminary operation may be performed. Further, if the function to follow the preceding vehicle is mounted on the vehicle 10, the function may be activated. As a result, a rear-end collision can be avoided.

In step S36, other processing based on the vehicle data is executed. In this step, known safety-related processing using V2V communication is performed, for example, processing for avoiding a collision of a meeting head or a contact at the time of a lane change.

As described above, in the vehicle system according to the first embodiment, when the alert to decelerate is outputted in a preceding vehicle, the driver in the succeeding vehicle is notified of the alert.

When the preceding vehicle and the following vehicles are traveling successively, the timing at which roadside-data-based alerts are given in the following vehicles is slower than preceding vehicle. However, in this embodiment, the driver of the succeeding vehicle can quickly shift to decelerating behavior because the attention is drawn in the succeeding vehicle at approximately the same timing as the alert is outputted in preceding vehicle. That is, the driver of the succeeding vehicle can be prepared even when a preceding vehicle is in a situation where it performs a sudden deceleration or the like.

Second Embodiment

In the first embodiment, the driver of the subsequent vehicle was notified when an alert was being output at the preceding vehicle. In contrast, the second embodiment is an embodiment in which the following vehicle is automatically decelerated when the following vehicle is traveling following the preceding vehicle.

In the second embodiment, the vehicle platform 300 further includes an ECU for performing follow-up control. Tracking control is a control that runs while maintaining a certain distance between the preceding vehicle and the host vehicle. Following control is also called adaptive cruise control.

When the tracking control is enabled, the vehicle 10 detects a preceding vehicle by, for example, inter-vehicle communication, cameras, millimeter-wave radar, or the like, and automatically controls the speed so that the inter-vehicle distance does not fall below a predetermined value.

In the second embodiment, in Step S35, the own vehicle is decelerated when an alert is output in the preceding vehicle while the tracking control is executed. For example, by decreasing the target cruising speed setting, the own vehicle can be decelerated and the distance between the own vehicle and preceding vehicle can be increased.

Thus, according to the second embodiment, even when performing the tracking control, it is possible to prepare for a rapid deceleration of the preceding vehicle.

(Variation of the Second Embodiment)

The driver of the preceding vehicle who received the alert might not have followed the alert. That is, the driver of the preceding vehicle may have ignored the signal. In such cases, the following vehicles should not follow the preceding vehicle. Therefore, if the preceding vehicle does not decelerate according to the alert, the following control of the subsequent vehicle may be stopped.

For example, after executing the process of step S35, the vehicle data transmitted from the preceding vehicle may be monitored, and if the preceding vehicle does not start decelerating within a predetermined period, the tracking control may be stopped. This prevents succeeding vehicles from continuing to follow the preceding vehicle.

(Other Modifications)

The above embodiment is merely an example, and the present disclosure can be appropriately modified and practiced without departing from the gist thereof.

For example, the processing and units described in the present disclosure can be freely combined and implemented so long as technical inconsistencies do not occur.

In the description of the embodiment, data relating to the state of the lights of the traffic signals is transmitted as the roadside data, but the roadside data may include other information. For example, the roadside data may be intended to notify the presence of a pause point, the presence of a railroad crossing, the presence of oncoming vehicles or obstacles, the presence of a traffic jam, and the like.

Further, in the description of the embodiments, by comparing the predefined speed pattern with the speed of the vehicle, it was determined whether to output an alert, however, other methods may be utilized to determine whether to output an alert. For example, a value indicating the degree of danger corresponding to the vehicle may be calculated, and an alert may be output when the degree of danger exceeds a predetermined value.

Further, in the description of the embodiments, an example has been described in which the vehicle data is transmitted through inter-vehicle communication, however, the method of transmitting the data is not limited to inter-vehicle communication. For example, if an alert is being output at a target vehicle, the center server may transmit corresponding vehicle data to other vehicles located in the vicinity of the target vehicle.

Further, in the description of the embodiments, an example has been described in which the same in-vehicle terminal 200 is mounted to the preceding vehicle and the subsequent vehicle, but the terminal mounted to the preceding vehicle may be different from the terminal mounted to the subsequent vehicle. In this case, it is sufficient that the terminal mounted on the preceding vehicle has the functions of the state notifying unit 2011 and the alert unit 2012, and the terminal mounted on the subsequent vehicle has the function of the preceding vehicle monitoring unit 2013.

Furthermore, although the description of the embodiment shows an example in which the roadside unit 100 provides data to the in-vehicle terminal 200, if the preceding vehicle can output an alert based on some data provided from the outside, the apparatus providing the data does not necessarily have to be the roadside apparatus 100.

In addition, the processing described as being performed by one device may be shared and executed by a plurality of devices. Alternatively, the processing described as being performed by different devices may be executed by one device. In a computer system, the hardware configuration (server configuration) which realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and a read-only memory (ROM), a random access memory (RAM), EPROM, EEPROM, a magnetic card, flash memory, an optical card, or any type of medium suitable for storing electronic instructions.

What is claimed is:

1. An information processing apparatus mounted on a first vehicle, comprising a controller configured to:
    determine that an alert to decelerate is being issued to a driver of a preceding vehicle preceding the first vehicle, wherein the controller determines, based on data transmitted from the preceding vehicle, that the alert is being issued in the preceding vehicle;
    in a case where the alert is issued in the preceding vehicle, determine whether or not the first vehicle performs control following the preceding vehicle, and whether or not the preceding vehicle starts decelerating within a predetermined period;
    and stop the control following the preceding vehicle in a case where the first vehicle performs the control following the preceding vehicle and the preceding vehicle does not start decelerating within the predetermined period.

2. The information processing apparatus according to claim 1, wherein
    the data includes location information of the vehicle that has transmitted the data, and the controller determines the data transmitted from the preceding vehicle based on the location information included in the data.

3. The information processing apparatus according to claim 1, wherein
    the data includes location information and direction of travel of the vehicle that has transmitted the data, and the controller determines the data transmitted from the preceding vehicle based on the location information and direction of travel included in the data.

4. The information processing apparatus according to claim 1, wherein
    the controller notifies the driver of the first vehicle that the preceding vehicle may be decelerated in response to the alert to decelerate being issued to the driver of the preceding vehicle.

5. An information processing apparatus mounted on a first vehicle, comprising a controller configured to:
    alert a driver of the first vehicle to decelerate based on first data received from an external device;
    when an alert to the driver is issued, transmit second data indicating that the alert has been issued, to the outside;
    in a case where the second data is received from a preceding vehicle, which is a vehicle preceding the first vehicle, determine whether or not the first vehicle performs control following the preceding vehicle, and whether or not the preceding vehicle starts decelerating within a predetermined period; and
    stop the control following the preceding vehicle in a case where the first vehicle performs the control following the preceding vehicle and the preceding vehicle does not start decelerating within the predetermined period.

6. The information processing apparatus according to claim 5, wherein
    the controller stops the control following the preceding vehicle in a case where the second data is received from the preceding vehicle and the first vehicle performs control following the preceding vehicle, regardless of contents of the first data.

7. The information processing apparatus according to claim 5, wherein the controller generates the second data including location information of the first vehicle and determines the second data transmitted from the preceding vehicle based on the location information included in the received second data.

8. The information processing apparatus according to claim 5, wherein the controller:

generates the second data including location information and a direction of travel of the first vehicle, and determines the second data transmitted from preceding vehicle based on the location information and the direction of travel included in the received second data.

9. The information processing apparatus according to claim 5, wherein the controller notifies a driver of the first vehicle as the predetermined process that the preceding vehicle may decelerate in response to the alert to decelerate being issued to the driver of the preceding vehicle.

10. The information processing apparatus according to claim 5, wherein the controller:

calculates a degree of danger based on the first data and the driving condition of first vehicle, and when the degree of danger is equal to or greater than a predetermined value, the alert is generated.

11. The Information processing apparatus according to claim 5, wherein the external device is a roadside unit associated with a traffic signal, and wherein the first data is data that predicts stop signal.

12. An information processing method executed a first vehicle, the information processing method comprising:

determining that an alert to decelerate is being issued to a driver of a preceding vehicle, which is a vehicle preceding the first vehicle, wherein a determination of whether the alert is being issued in the preceding vehicle is based on data transmitted from the preceding vehicle;

in a case where the alert is issued in the preceding vehicle, determining whether or not the first vehicle performs control following the preceding vehicle, and whether or not the preceding vehicle starts decelerating within a predetermined period; and stopping the control following the preceding vehicle in a case where the first vehicle performs the control following the preceding vehicle and the preceding vehicle does not start decelerating within the predetermined period.

13. The information processing method according to claim 12, wherein the data includes location information of the preceding vehicle that transmitted the data, and the information processing method comprising determining the data transmitted from the preceding vehicle based on the location information included in the data.

14. The information processing method according to claim 12, wherein the information processing method comprising notifying a driver of the first vehicle that the preceding vehicle may be decelerated in response to the alert to decelerate being issued to the driver of the preceding vehicle.

15. A non-transitory computer readable storing medium recording a computer program for causing a computer to perform an information processing method according to claim 12.

* * * * *